United States Patent [19]
Ort et al.

[11] 3,831,088
[45] Aug. 20, 1974

[54] PULSED SIGNAL PHASE LOCK SPECTRAL PURITY MEASURING APPARATUS

[75] Inventors: Eldon L. Ort, Doylestown; Stinson R. Swyers, New Hope, both of Pa.

[73] Assignee: The United States of America as represented by the Secretary of the Navy, Washington, D.C.

[22] Filed: Aug. 1, 1973

[21] Appl. No.: 384,775

[52] U.S. Cl. ............................................. 324/77 E
[51] Int. Cl. ............................................. G01r 23/16
[58] Field of Search...... 324/77 R, 77 B, 77 E, 79 R

[56] References Cited
UNITED STATES PATENTS
3,649,909  3/1972  Ort et al. .......................... 324/77 E
3,716,784  2/1973  Whitehead et al. ................ 324/77 B OTHER PUBLICATIONS
Ross et al., Electronics, Aug. 1956; pp. 179–181.

*Primary Examiner*—Alfred E. Smith
*Attorney, Agent, or Firm*—R. S. Sciascia; Henry Hansen

[57] ABSTRACT

Apparatus for measuring the spectral purity of a low duty cycle pulsed signal. A continuous wave (CW) reference signal is mixed with the pulsed signal forming an IF signal that is applied to one input of a phase detector. The output of the phase detector is amplified and applied to a sample and hold circuit which compresses the pulse spectrum of the pulse signal under test. After a time delay the sample and hold circuit provides an output to a voltage controlled oscillator which supplies a variable frequency CW signal to a second input of the phase detector to complete a phase locked loop allowing FM sideband detection. The sample and hold circuit output is passed, for example, to wave analyzers or through a threshold detector arranged to drive an indicator.

10 Claims, 1 Drawing Figure

3,831,088

PULSED SIGNAL PHASE LOCK SPECTRAL PURITY MEASURING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of frequency measurement devices and in particular to test apparatus for analysis of spurious FM sidebands in low duty cycle pulsed signals. Apparatus for analyzing the spectral purity of CW wide band signals is well known in the art and is disclosed in U.S. Pat. No. 3,649,909 to Ort et al. The invention disclosed in the present application represents a significant improvement over the prior art in that pulsed signals on the order of 0.001 or greater duty cycle may now be analyzed for spectral purity. In a pulsed radar system, the frequency difference between the transmitted signal pulse and the return echo is related to the transmitting frequency and the relative speed of the reflected target object. For relatively slow moving targets, the echo will be returned at a frequency very close to the transmitting frequency. Accordingly, the pulsed signal being transmitted must have good spectral purity, ideally emitting maximum energy in a single, sharply defined frequency. If FM sideband noise close to the central transmitting frequency is present, spurious spectral signals may appear in the echo signal as false moving targets. Moreover, dense spurious sidebands may mask real targets and degrade the reliability of detection.

SUMMARY OF THE INVENTION

Accordingly, it is an object of the present invention to provide means for indicating the spectral purity and frequency stability of pulsed signals having a duty cycle of 0.001 or greater. Another object of the invention is to detect FM noise with greater sensitivity within a few cycles of the carrier frequency. Yet another object of the invention is to provide a quantitative description of spurious sidebands in order to furnish information useful in systems analysis problems, such as determining the sensitivity limitations of radar systems for doppler target detection. A further object of the invention is to maintain phase lock with the pulsed signal regardless of drift.

These and other objects of the invention are accomplished by mixing a low duty cycle pulsed signal with a continuous wave reference signal to form an IF signal that is applied to one input of a phase detector. The output of the phase detector is amplified and applied to a sample and hold circuit which compresses the pulse spectrum of the pulsed signal under test. After a time delay the sample and hold circuit provides an output to a voltage controlled oscillator which supplies a variable frequency CW signal to a second input of the phase detector to complete a phase locked loop allowing FM sideband detection. The sample and hold circuit output is then passed to wave analyzers or through a threshold detector arranged to drive an indicator.

DESCRIPTION OF THE PREFERRED EMBODIMENT

Figure 1:
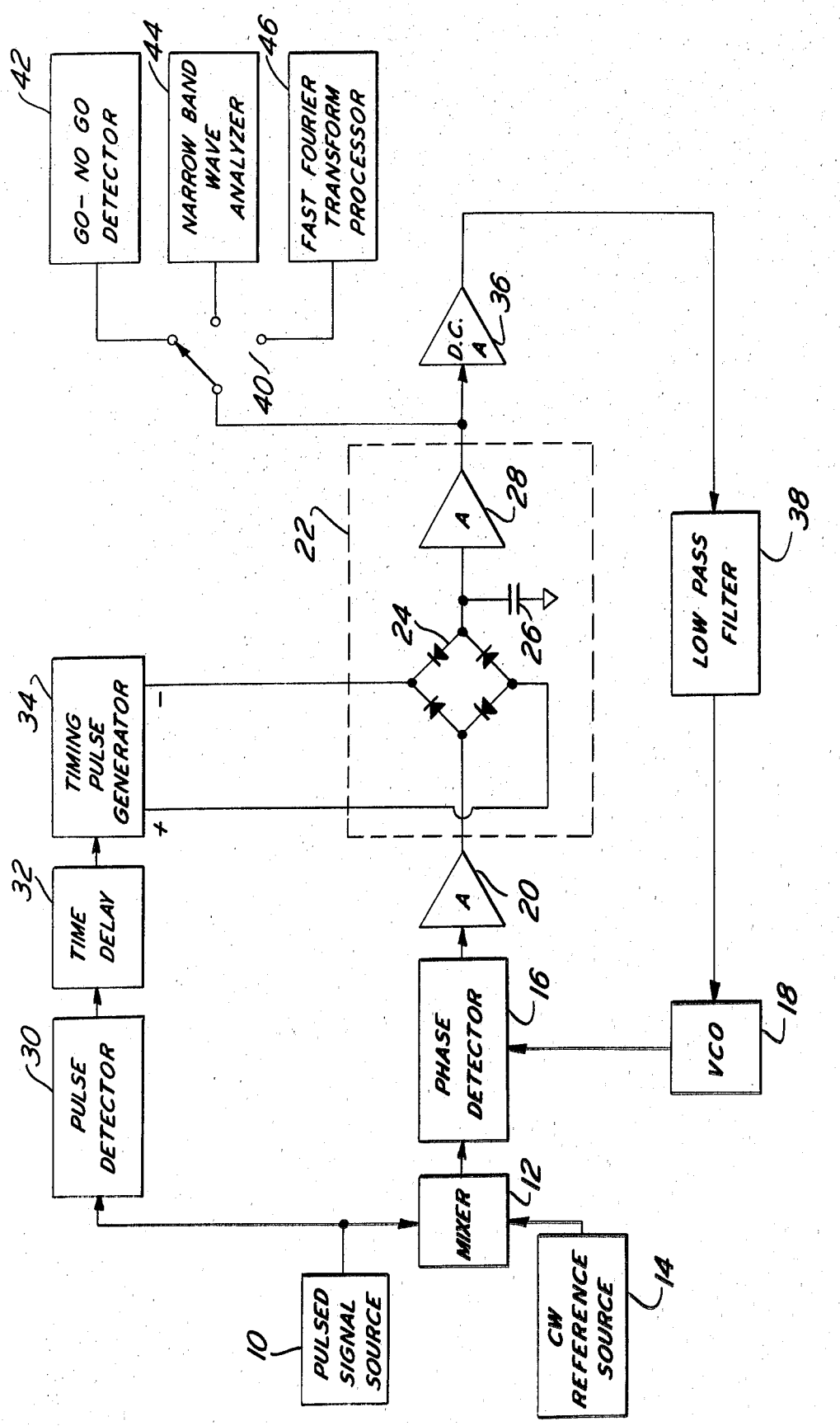
FIG. 1 is a block diagram of spectral purity measuring apparatus according to the invention.

Referring now to FIG. 1, the output of a pulsed signal source 10 whose spectral purity is to be measured is passed to one input of a mixer 12. The duty cycle of the pulsed signal can be as low as 0.001. The other input to the mixer 12 is from a continous wave (CW) reference signal 14. Mixer 12 combines the two input signals to produce an intermediate frequency (IF) output signal which is passed to a phase detector 16. Phase detector 16 operates like a mixer beating two input signals together, but its output contains an essentially D.C. component related to the phase difference of the two input signals. This D.C. component changes from a slowly varying signal to a steady or nulled signal when the input signals are in quadrature, that is, 90° out of phase with each other. Those skilled in the art will recognize that the output of phase detector 16 will contain FM sidebands with no AM noise only when the input signals are maintained in quadrature. The output of a voltage controlled oscillator (VCO) 18 is connected to the other input of phase detector 16. The output of phase detector 16 is connected to the input of a low noise amplifier 20 whose output is passed to a sample and hold circuit 22. The sample and hold circuit 22 includes a diode switch 24 having an input connected to the output of the amplifier 20, and a storage capacitor 26 and an amplifier 28 commonly connected to the output of the switch 24. A pulse detector 30 is connected to receive the signals from the pulsed signal source 10 and provides an output signal to a time delay circuit 32. The time delay 32 provides an output to a timing pulse generator 34 having bipolar voltage outputs connected to the diode switch 24. A feedback loop includes a D.C. amplifier 36 connected to receive the output signal from amplifier 28 and provides a signal output to a low-pass filter 38 which passes a control output signal to the input of the voltage controlled oscillator 18. The output signal from amplifier 28 provides a system output which is selectively connected by means of a switch 40 to a threshold indicator such as a go-no go detector 42, a narrow-band wave analyzer 44 or a fast Fourier transform processor 46. Of course, it will be obvious to those skilled in the art that any suitable device for analyzing the sidebands around the carrier frequency may be simply attached to the system output.

The operation of the apparatus will now be described with reference to FIG. 1. For purposes of explanation, it is assumed that the pulsed signal has a frequency of 10 GHz. The CW reference source is adjusted to provide a signal frequency within 50 MHz. of the pulsed signal frequency. The CW signal is applied to the other input of the mixer 12. The mixer 12 provides a resulting IF signal of 10 KHz to 50 MHz to one input of the phase detector 16. A second input of the phase detector 16 receives a correction signal from the voltage controlled oscillator 18. The output of the phase detector 16 is fed to amplifier 20 which preferably exhibits low-noise characteristics and is used to increase the system signal-to-noise ratio. The output of amplifier 20 is sent to the sample and hold circuit 22 which compresses the spread pulse spectrum of the low-duty cycle pulse source 10 which is under test by sampling the phase detector output signal at the pulse repetition frequency (PRF) rate of the pulsed signal and storing the sample. A pulse spectrum is spread as a function of one over the duty cycle. The diode switch 24 within the sample and hold circuit 22 is normally biased off and is connected to receive the output signal from the amplifier 20. The pulse detector 30 detects the existence of a pulse from the pulsed signal source 10 and drives the time delay circuit 32 which allows the pulsed signal under test to reach its full "on" state before it is sampled by the sample and hold circuit 22. After an appropriate time delay, the time delay 32 drives the timing pulse generator 34 whose bipolar voltage outputs trigger the diode switch 24 into conduction. Once conducting, the switch 24 simultaneously passes the output signal from the amplifier 20 to the capacitor 26 which stores the signal information, and to amplifier 28 in order to increase the stored signal level. The output of the sample and hold circuit 22 is commonly provided to an output terminal switch 40 and to the input of a system feedback loop comprising the D.C. amplifier 36, low-pass filter 38 and voltage controlled oscillator 18. The low-pass filter 38 receives the amplified signal from D.C. amplifier 36 and typically passes those signals of approximately five cycles and below to the input of the voltage controlled oscillator 18. Accordingly, the phase lock effect of the invention is to phase track the pulsed signal input within five cycles of the carrier frequency. The low pass filter prohibits the passage of higher frequencies which are present at the output terminal switch 40 for further processing. The bandwidth of filter 18 is typically chosen to be consonant with the frequency stability of both the CW source 14 and the pulsed signal source 10. Thus the correction signal compensates only for the expected instability of the signal sources and allows sideband noise within the remaining frequency spectrum to be analyzed. The output terminal switch 40 may be connected to different signal analyzing devices, as for example, the go-no go detector 42, the narrow-band wave analyzer 44 or the fast Fourier transform processor 46 wherein the FM noise vs. frequency of the pulsed signal under test may be analyzed. The go-no go detector 42 typically comprises a threshold detector which measures the noise power within a particular bandwidth and drives an indicator if the power level is higher than some predetermined value. The narrow band wave analyzer 44 typically provides a frequency window of 10 cycles in which the FM noise can be evaluated. The window is swept through the sideband frequency spectrum and an analysis of noise power vs. frequency can be made. The fast Fourier transform processor 46 being a digital device, can provide a window as small as one half cycle. As with most frequency analyzing devices, the smaller the window, the slower the speed at which the sideband frequency spectrum is swept.

Thus, there may be seen that there has been provided means for indicating the spectral purity and frequency stability of low-duty cycle pulse signals with more sensitive detection of FM sideband noise nearer the carrier frequency. Another advantage is that the reference source need not be precisely at the same frequency as the pulsed signal source to be tested since a relatively low IF frequency is generated.

Still another advantage lies in the relative simplicity of the test equipment that allows for small size, ease of manufacture and assembly, as well as light weight.

Obviously, many modifications and variations of the invention are possible in light of the above teachings. It is therefore to be understood that within the scope of the appended claims the invention may be practiced otherwise than as specifically described.

What is claimed is:

1. Spectral purity measuring apparatus for a low duty cycle pulsed signal comprising:

means for providing a continous wave signal;

mixer means connected to receive said continuous wave signal and adapted to receive the pulsed signal for producing an IF replica output of the pulsed signal;

variable oscillator means for producing an output frequency whose phase is varied according to a control signal input;

phase detector means having a first input connected to receive said IF replica output and a second input connected to receive the variable oscillator means output for producing an output indicative of phase quadrature of said first and second phase detector means inputs;

triggering means including pulse detector means connected to receive the pulsed signals for providing an output signal upon receipt of respective ones of said pulsed signals, time delay means connected to receive the pulse detector means output signal for providing an output signal representative of the input signal delayed in time, and timing generator means connected to receive the delayed output signal from said time delay means for providing an output signal indicative of the receipt of said delayed output signal;

sample and hold circuit means connected to receive the phase detector means output and the timing generator means output signal for selectively sampling and storing the phase detector means output upon receipt of the timing generator means output signal; and feedback means connected to receive said sample and hold circuit means stored output for providing the control signal input to said variable oscillator means;

said sample and hold circuit means stored output being indicative of spectral purity.

2. Spectral purity measuring apparatus according to claim 1 wherein:

said feedback means includes amplifying means connected to receive said selecting means output, and lowpass filter means connected to receive the output of said amplifying means for providing said control signal input to said variable oscillator means.

3. Spectral purity measuring apparatus according to claim 2 wherein a go-no go indicator for producing a single output indicative of an acceptable level of spectral purity is connected to receive said selecting means output.

4. Spectral purity measuring apparatus according to claim 2 wherein a wave analyzer for producing an output indicative of spectral purity is connected to receive said selecting means output.

5. Spectral purity measuring apparatus according to claim 1 wherein said switching means includes a diode gate.

6. Spectral purity measuring apparatus according to claim 5 wherein:
said feedback means includes amplifying means connected to receive said selecting means output, and lowpass filter means connected to receive the output of said amplifying means for providing said control signal input to said variable oscillator means.

7. Spectral purity measuring apparatus according to claim 6 wherein a go-no go indicator for producing a single output indicative of an acceptable level of spectral purity is connected to receive said selecting means output.

8. Spectral purity measuring apparatus according to claim 6 wherein a wave analyzer for producing an output indicative of spectral purity is connected to receive said selecting means output.

9. Spectral purity measuring apparatus according to claim 1 wherein said storage means is a capacitor.

10. Spectral purity measuring apparatus for a low duty cycle pulsed signal comprising:
means for providing a continuous wave signal;
mixer means connected to receive said continuous wave signal and adapted to receive the pulsed signal for producing an IF replica output of the pulsed signal;
variable oscillator means for producing an output frequency whose phase is varied according to a control signal input;
phase detector means having a first input connected to receive said IF replica output and a second input connected to receive the variable oscillator means output for producing an output indicative of phase quadrature of said first and second phase detector means inputs;
triggering means connected to receive said pulsed signal for providing an output signal indicative of the receipt of each pulse of said pulsed signal;
sample and hold circuit means including switching means connected to receive the phase detector means output and the triggering means output signal for passing the phase detector means output upon the receipt of the output signal from said triggering means, and storage means connected to receive the passed signal from said switching means for storing said passed signal for a predetermined period of time; and
feedback means connected to receive the storage means stored signal for providing the control signal input to said variable oscillator means;
said storage means stored signal being indicative of spectral purity.

* * * * *